United States Patent
Zingelmann, Jr.

(10) Patent No.: US 9,963,846 B2
(45) Date of Patent: May 8, 2018

(54) DRIVE SHAFT BEARING STRUCTURE ASSEMBLIES FOR SNOWBLOWER TRACK-TYPE DRIVEN SPROCKET AND RELATED METHODS

(71) Applicant: Honda Motor Co., Ltd., Tokyo (JP)

(72) Inventor: Christopher Kurt Zingelmann, Jr., Raleigh, NC (US)

(73) Assignee: Honda Motor Co., Ltd., Tokyo (JP)

( * ) Notice: Subject to any disclaimer, the term of this patent is extended or adjusted under 35 U.S.C. 154(b) by 78 days.

(21) Appl. No.: 14/264,907

(22) Filed: Apr. 29, 2014

(65) Prior Publication Data

US 2015/0308061 A1    Oct. 29, 2015

(51) Int. Cl.

| | |
|---|---|
| *E01H 5/09* | (2006.01) |
| *F16H 57/021* | (2012.01) |
| *B62D 55/125* | (2006.01) |
| *F16C 3/02* | (2006.01) |
| *F16C 35/04* | (2006.01) |
| *F16C 17/02* | (2006.01) |
| *F16C 35/02* | (2006.01) |

(52) U.S. Cl.
CPC ........... *E01H 5/098* (2013.01); *B62D 55/125* (2013.01); *F16C 3/02* (2013.01); *F16C 17/02* (2013.01); *F16C 35/02* (2013.01); *F16C 35/042* (2013.01); *F16H 57/021* (2013.01)

(58) Field of Classification Search
CPC . E01H 5/08; E01H 5/98; F16H 57/021; F16H 2057/0216; B62D 55/125; F16C 3/02; F16C 35/042

USPC ........................................... 74/665 GE, 60 R
See application file for complete search history.

(56) References Cited

U.S. PATENT DOCUMENTS

| | | | | |
|---|---|---|---|---|
| 1,918,167 | A * | 7/1933 | Woolson | F16H 3/04 |
| | | | | 74/332 |
| 2,566,724 | A * | 9/1951 | Heil | A01D 42/08 |
| | | | | 180/6.2 |
| 2,667,938 | A * | 2/1954 | Cartlidge | B62D 55/125 |
| | | | | 180/9.64 |
| 2,776,505 | A * | 1/1957 | Root | E01H 5/076 |
| | | | | 37/252 |

(Continued)

FOREIGN PATENT DOCUMENTS

| | | | | |
|---|---|---|---|---|
| GB | | 783335 A * | 9/1957 | ............. B60K 17/16 |
| JP | S 6447620 | | 2/1989 | |

(Continued)

*Primary Examiner* — Joseph M Rocca
*Assistant Examiner* — Maurice L Williams
(74) *Attorney, Agent, or Firm* — Jenkins, Wilson, Taylor & Hunt, P.A.

(57) ABSTRACT

Drive shaft bearing structure assemblies and methods for a snowblower can include a transmission and at least one drive shaft coupled to the transmission. The assembly can further include a transmission casing containing the transmission. The transmission casing can include at least one bearing structure. The bearing structure can be configured to receive a portion of the drive shaft during axial rotation of the shaft. In some aspects, there can be two drive shafts. In this aspect, the bearing structure can be configured to receive a first portion of each of the two drive shafts during axial rotation of the drive shafts. In another aspect, the bearing structure is bolted onto the transmission casing as a journal bearing.

20 Claims, 7 Drawing Sheets

(56) References Cited

U.S. PATENT DOCUMENTS

| | | | |
|---|---|---|---|
| 2,903,077 A * | 9/1959 | Kamlukin | A01B 33/028 |
| | | | 172/125 |
| 3,850,050 A | 11/1974 | Lemmens | |
| 3,897,984 A * | 8/1975 | Matheny, Jr. | B60K 5/1283 |
| | | | 384/582 |
| 4,116,080 A | 9/1978 | Berens | |
| 4,492,271 A | 1/1985 | Doering | |
| 4,739,852 A * | 4/1988 | Stevens | B62D 55/125 |
| | | | 180/372 |
| 4,771,654 A * | 9/1988 | Shinjo | F16H 1/2836 |
| | | | 475/31 |
| 4,934,989 A | 6/1990 | Furukawa et al. | |
| 5,123,186 A | 6/1992 | Matushita et al. | |
| 5,174,053 A | 12/1992 | Takeshita | |
| 5,438,770 A | 8/1995 | Miller | |
| 6,470,602 B2 | 10/2002 | White et al. | |
| 7,159,343 B2 | 1/2007 | Hanafusa et al. | |
| 7,540,102 B2 | 6/2009 | Olmr et al. | |
| 7,703,223 B2 | 4/2010 | Walker et al. | |
| 7,730,642 B2 | 6/2010 | Sugiura | |
| 8,065,823 B2 | 11/2011 | Morrell | |
| 8,191,289 B2 | 6/2012 | Raftery | |
| 8,337,346 B2 | 12/2012 | Kochidomari et al. | |
| 2002/0171211 A1 * | 11/2002 | Herman | B62D 11/08 |
| | | | 280/28.5 |
| 2004/0045747 A1 * | 3/2004 | Albright | B62D 55/305 |
| | | | 180/9.1 |
| 2005/0035655 A1 * | 2/2005 | Beckstrom | B62D 55/112 |
| | | | 305/173 |
| 2005/0157966 A1 * | 7/2005 | Tsukada | B62K 11/00 |
| | | | 384/537 |
| 2008/0276891 A1 * | 11/2008 | Kohls | F02N 3/04 |
| | | | 123/179.24 |
| 2009/0127007 A1 * | 5/2009 | Tsujita | B60K 17/043 |
| | | | 180/6.3 |
| 2012/0161511 A1 * | 6/2012 | Brazier | B62D 55/12 |
| | | | 305/178 |
| 2013/0281236 A1 * | 10/2013 | Ishino | F16H 37/022 |
| | | | 474/72 |
| 2015/0240934 A1 * | 8/2015 | Hoffman | F16H 57/021 |
| | | | 474/150 |

FOREIGN PATENT DOCUMENTS

| | | | | |
|---|---|---|---|---|
| JP | H 06305336 | | 11/1994 | |
| JP | 2009078699 | * | 4/2009 | B60K 17/06 |

* cited by examiner

DRIVE SHAFT BEARING STRUCTURE ASSEMBLIES FOR SNOWBLOWER TRACK-TYPE DRIVEN SPROCKET AND RELATED METHODS

TECHNICAL FIELD

The subject matter described herein relates generally to a drive assembly. More specifically, the subject matter disclosed herein relates to a drive shaft bearing structure assemblies and methods for power equipment, particularly suitable for a track-type snowblower.

BACKGROUND

Typically, the drive assembly in a conventional track-type snowblower utilizes both a main drive transmission and a separate gearbox to drive the track front sprockets. In this configuration, the separate gearbox has gear reduction and internal bearing surfaces for a drive shaft(s) to bear against during operation. However, the separate gearbox adds weight to the drive assembly and can be bulky; thus, it is undesirable in a tight layout condition.

Therefore, there is a need for a drive shaft bearing structure for a track-type snowblower that can be utilized in a tight layout condition.

SUMMARY

In accordance with this disclosure, a novel drive shaft bearing structure assembly for snowblower track-type driven sprocket and method are provided. It is therefore an object of the present disclosure to provide novel drive shaft bearing structure assembly and method that provide a main drive transmission comprising a bearing structure assembly for a track-type snowblower. This and other objects as may become apparent from the present disclosure are achieved, at least in whole or in part, by the subject matter described herein.

In one aspect, the subject matter described herein can comprise a drive shaft bearing structure assembly for a track-type snowblower, the assembly comprising a transmission, at least one drive shaft coupled to the transmission and a transmission casing containing the transmission. In some aspects, the transmission casing can comprise at least one bearing structure, such as part of the transmission casing, where the bearing structure can be configured to receive a portion of the drive shaft during axial rotation of the drive shaft.

In another aspect, the subject matter described herein can comprise a track-type snowblower comprising a transmission, at least one drive shaft coupled to the transmission and a transmission casing containing the transmission. In some aspects, the transmission casing can comprise at least one bearing structure, where the bearing structure can be configured to receive a portion of the drive shaft during axial rotation of the drive shaft.

In a further aspect, the subject matter described herein can comprise a method of driving a track-type snowblower comprising coupling a drive shaft to a transmission contained in a transmission casing and actuating the transmission to rotate the drive shaft. The transmission casing can comprise at least one bearing structure and can be configured to receive a portion of the drive shaft during rotation of the drive shaft.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1:
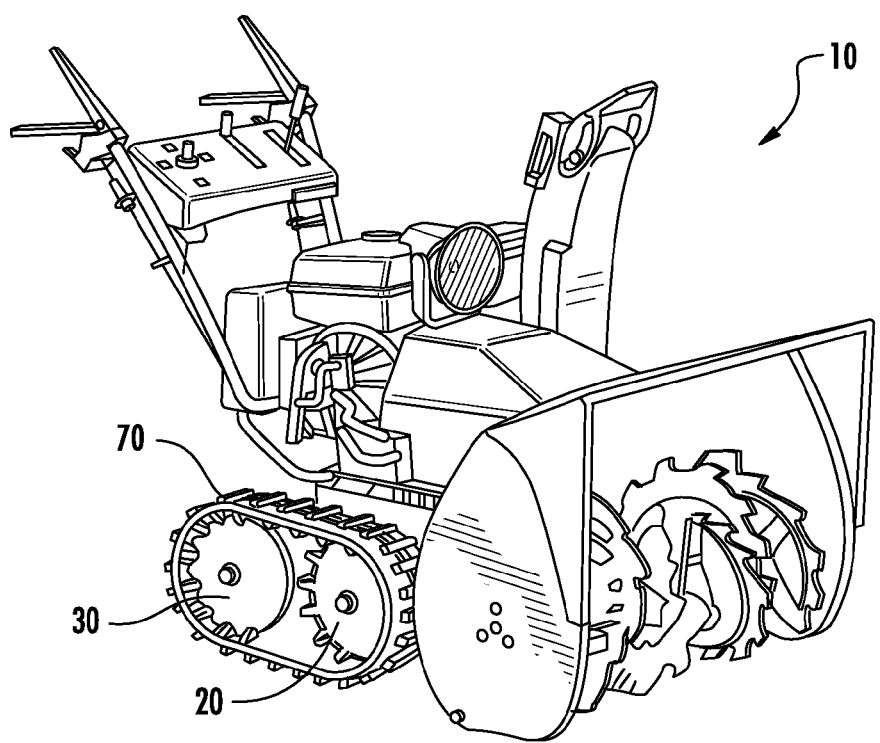
FIG. 1 of the drawings is a perspective view of an embodiment of a snowblower according to the present subject matter.

Reference will now be made in detail to the description of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

In some aspects, drive shaft bearing structure assembly for a snowblower described herein can be utilized in a track-type or wheel-type snowblower configuration. A snowblower configured as a wheel-type snowblower can utilize a drive shaft bearing structure assembly and related method such that the drive shaft bearing structure can for example be a part of the transmission casing. In other words, the drive shaft bearing structure can be integral or attached, such as fixedly attached, to the transmission casing by any suitable structure or approach, such as for example and without limitation bolting, welding, casting, or any other suitable technique.

In other aspects, a drive shaft bearing structure assembly and related method described herein can be utilized in a track-type snowblower. A drive shaft bearing structure assembly for snowblower track-type driven sprocket and related method described herein can include a drive shaft bearing structure assembly for a track-type snowblower. The assembly can include a transmission, at least one drive shaft coupled to the transmission, and a transmission casing containing the transmission. In one aspect, the transmission casing can comprise at least one bearing structure as part of the transmission casing. Additionally, the bearing structure can be configured to receive a portion of the drive shaft during axial rotation of the drive shaft.

In other aspects, a drive shaft bearing structure assembly for snowblower track-type driven sprocket and related method described herein can include a track-type snowblower. The track-type snowblower can include a drive shaft bearing structure assembly for a track-type snowblower. The assembly can include a transmission, at least one drive shaft coupled to the transmission, and a transmission casing containing the transmission. In one aspect, the transmission casing can comprise at least one bearing structure as part of the transmission casing. Additionally, the bearing structure can be configured to receive a portion of the drive shaft during axial rotation of the drive shaft.

In other aspects, a drive shaft bearing structure assembly for snowblower track-type driven sprocket and related method described herein can include a method of driving a track-type snowblower. The method can comprise coupling at least one drive shaft to a transmission contained in a transmission casing and actuating the transmission to rotate the drive shaft. In some aspects, the transmission casing can comprise at least one bearing structure as part of the transmission casing. The bearing structure can be configured to receive a portion of the drive shaft during axial rotation of the drive shaft.

In further aspects, the drive shaft bearing structure assembly for snowblower track-type driven sprocket and related method can further comprise at least one of: a main output shaft coupled to both the transmission and the drive shaft; at least one rear chain sprocket mounted to the main output shaft and at least one front chain sprocket mounted to the drive shaft; two drive shafts; a pair of front track sprockets, one of each positioned at a second portion of each of the two drive shafts; and/or a pair of rollers coupled to the front track sprockets. In one aspect, the drive shaft bearing structure can be configured as at least two bushings. For example, each of the bushings can comprise a bearing surface, where each bearing surface can be configured to receive a first portion of one of two drive shafts during axial rotation of the drive shafts. Additionally, the bushings of the bearing structure can be configured such that the bearing surfaces can be disposed on opposing, opposite sides of the transmission casing, such that a center of each bearing surface is co-axially aligned with a center of the other bearing surface. Further, the bearing structure can be bolted onto the transmission casing as a journal bearing, although one of ordinary skill in the art will understand that any type of appropriate bearing could be used instead.

Aspects of the present subject matter now will be described more fully hereinafter with reference to the accompanying drawings, in which some aspects of the present subject matter are shown. This present subject matter may, however, be embodied in many different forms and should not be construed as limited to the embodiments set forth herein. Like numbers refer to like elements throughout.

As illustrated in the various figures, some sizes of structures or portions are exaggerated relative to other structures or portions for illustrative purposes and, thus, are provided to illustrate the general structures of the present subject matter. Furthermore, various aspects of the present subject matter are described with reference to a structure or a portion being formed on other structures, portions, or both. As will be appreciated by those of skill in the art, references to a structure being formed "on" or "above" another structure or portion contemplates that additional structure, portion, or both may intervene. References to a structure or a portion being formed "on" another structure or portion without an intervening structure or portion are described herein as being formed "directly on" the structure or portion. Similarly, it will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

Furthermore, relative terms such as "on", "above", "upper", "top", "lower", or "bottom" are used herein to describe one structure's or portion's relationship to another structure or portion as illustrated in the figures. It will be understood that relative terms such as "on", "above", "upper", "top", "lower" or "bottom" are intended to encompass different orientations of the package or component in addition to the orientation depicted in the figures. For example, if the package or component in the figures is turned over, structure or portion described as "above" other structures or portions would now be oriented "below" the other structures or portions. Likewise, if the package or component in the figures are rotated along an axis, structure or portion described as "above", other structures or portions would be oriented "next to" or "left of" the other structures or portions.

Unless the absence of one or more elements is specifically recited, the terms "comprising", including", and "having" as used herein should be interpreted as open-ended terms that do not preclude the presence of one or more elements.

FIG. 1 of the drawings illustrates a power equipment device shown in one aspect as a snowblower, generally designated 10, which can use a drive shaft bearing structure assembly to drive the track-type drive mechanism of snowblower 10. In one aspect, the track-type drive mechanism can be configured as illustrated in FIG. 1, where the track-type drive mechanism has a pair of front track sprockets 20 and rollers 30. However, it is envisioned that the present disclosure could be used in association with other types of power equipment devices also utilizing a track-type drive mechanism and/or other types of power equipment utilizing a wheel-type drive mechanism.

Figure 2:
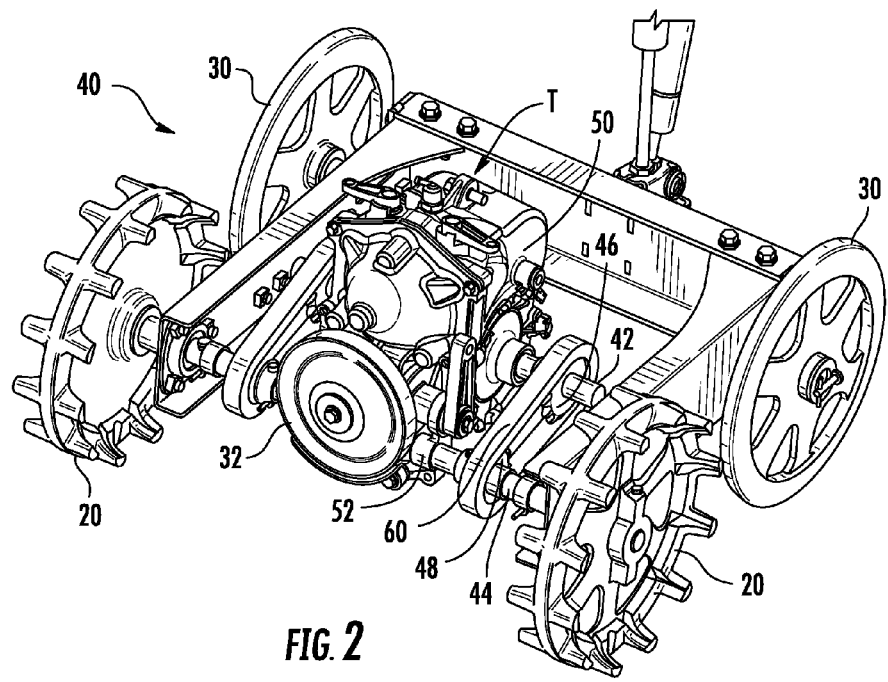
FIG. 2 of the drawings is a perspective view of an embodiment of a drive shaft bearing structure assembly.

FIG. 2 illustrates a drive shaft bearing structure assembly, generally designated 40, used to drive front track sprockets 20 of snowblower 10. Drive shaft bearing structure assembly 40 can include a transmission T that can receive torque from a suitable prime mover or motor P (See, for e.g. FIG. 5), such as an electric motor or an internal combustion engine, through a suitable torque transferring means such as a belt or shaft or the like. Transmission T can have any configuration suitable for transferring torque from the motor to, for example, a main output shaft 42 or a drive shaft 44, for the transfer of rotational energy to front track sprockets 20. For example, a direct drive transmission, a standard gear transmission, or any suitable transmission can be used, for example a Honda V45A transmission. Accordingly, in some embodiments, transmission T can be a variable-speed transmission, and particularly a continuously variable-speed transmission. Transmission T can also include a drive pulley (not shown) that is driven by motor P and is in contact with an outer circumference of a transmission wheel 32. Transmission wheel 32 can be moved along drive pulley to increase and decrease the speed at which main output shaft 42 or drive shaft 44 is rotated. Further, transmission wheel 32 can be positioned against drive pulley so as to reverse the direction of rotation of main output shaft 42 or drive shaft 44 so as to reverse the direction of rotation of front track sprockets 20 of snowblower 10.

In conventional track-type snowblowers, a gearbox separate from the main drive transmission is used to drive front track sprockets 20. This separate gearbox typically has separate gear reduction and internal bearing surfaces on which the drive shaft bears against during operation of snowblower 10. However, in the embodiment illustrated in FIG. 2, transmission T is advantageously configured in a single gearbox configuration and housed within a transmission casing 50. In this configuration, transmission T is configured to drive front track sprockets 20 from the main drive transmission (i.e. not a separate gearbox) through a transfer of power directly to drive shaft 44 or from main output shaft 42 to a drive shaft 44.

Figure 3A:
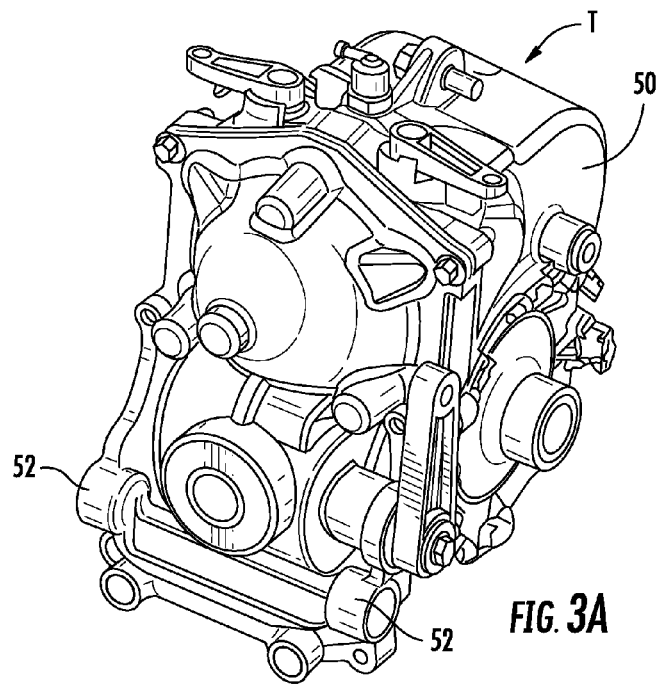
FIG. 3A of the drawings is a perspective view of an embodiment of a drive shaft bearing structure according to FIG. 2.
Figure 3B:
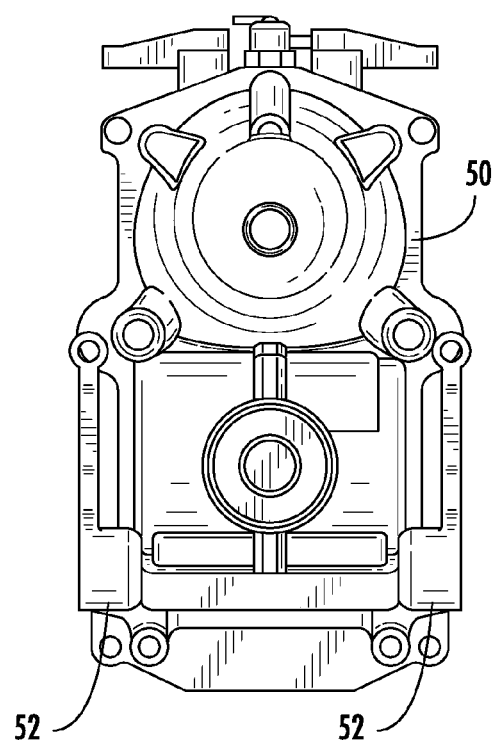
FIG. 3B of the drawings is a front view of an embodiment of the drive shaft bearing structure according to FIG. 3A.
Figure 3C:
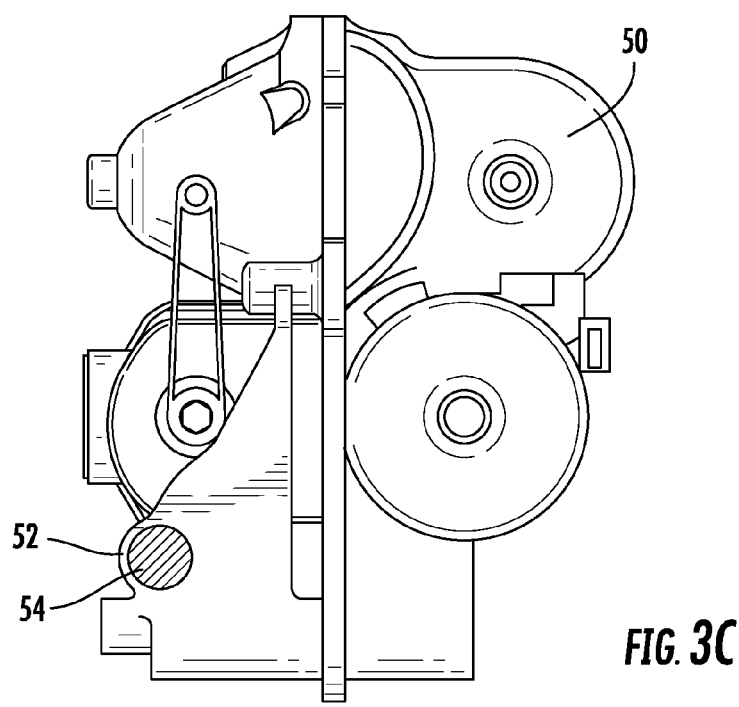
FIG. 3C of the drawings is a side view of an embodiment of the drive shaft bearing structure according to FIG. 3A.

FIGS. 3A-3C illustrate perspective, front and side views, respectively, of an embodiment of a transmission casing 50. Transmission casing 50 can be molded, welded, cast, etc. as an integral unit or can be an assembly of separately molded, cast, welded, etc. parts that either partially or totally encase transmission T. In one aspect, transmission casing 50 can comprise at least one bearing structure 52 as part of transmission casing 50. In other words, bearing structure 52 can be integral or fixedly attached to transmission casing 50. For example, bearing structure 52 can be welded, cast, molded, bolted and/or secured with an auxiliary feature (e.g. a retaining ring) onto a surface of transmission casing 50 during the original manufacturing process or can be an after-market addition to transmission casing 50. In one example, bearing structure 52 can be bolted onto a front surface of transmission casing 50, such that bearing structure 52 is disposed between front track sprockets 20. Additionally, bearing structure 52 can be bolted onto transmission casing 50 so that a transmission wheel 32 can rotate about its axis without interference from bearing structure 52. For example, each of the cylindrical protrusions or bushings of bearing structure 52 can be configured to be spaced apart a distance that is larger than the outermost diameter of transmission wheel 32.

In some aspects, bearing structure 52 can be configured as a journal bearing. However, one of ordinary skill in the art will understand that any suitable type of bearing structure may be used, such as, for e.g. a journal bearing, linear bearing or thrust bearing, etc. Where bearing structure 52 is configured as a journal bearing, bearing structure 52 can receive a portion of drive shaft 44 during axial rotation of drive shaft 44. For example, bearing structure 52 can be configured as hollow, cylindrical protrusions or bushings that provide a bearing surface 54 for drive shaft 44 to bear against during rotation. Where bearing structure 52 is configured as a bushing, the bushing can be designed as a solid (either sleeve or flanged), split or clenched bushing. In some aspects, bearing structure 52 can comprise two bushings, each extending axially away from a surface of transmission casing 50, in opposing, opposite directions. Each bushing can comprise an internal bearing surface 54 that can be configured such that a center of each bearing surface is co-axially aligned with a center of the other bearing surface. In such a configuration, drive shaft 44 can be configured as two separate drive shafts 44A and 44B that each drive their respective front track sprockets 20. Thus, each bushing of bearing structure 52 can further be configured with a diameter that can be larger than a diameter of respective drive shafts 44A and 44B. Further, internal bearing surfaces 54 can comprise surfaces that are compatible with a first portion of each of drive shafts 44A and 44B. For example, internal bearing surfaces 54 can be substantially planar, concave or convex and can comprise a substantially smooth or textured surface.

Figure 4A:
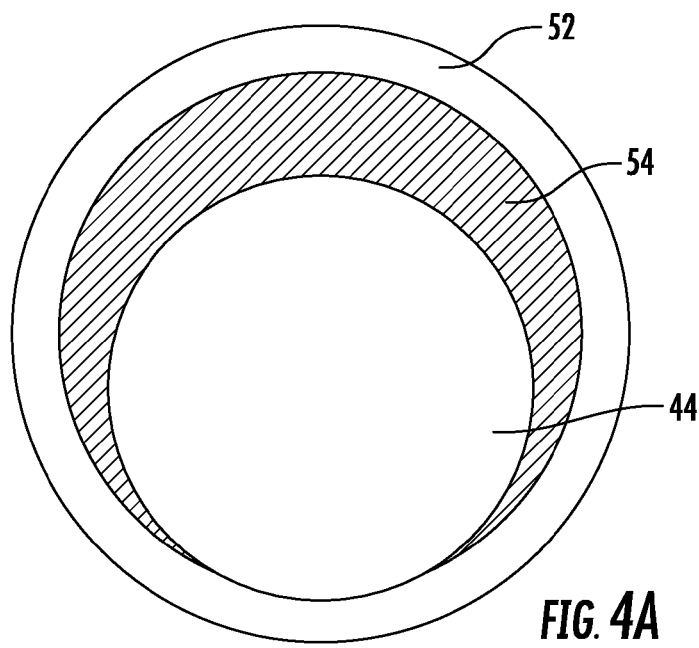
FIG. 4A of the drawings is an enlarged view of a drive shaft at rest in a bearing structure of an embodiment of the drive shaft bearing structure according to FIGS. 3A-3C.
Figure 4B:
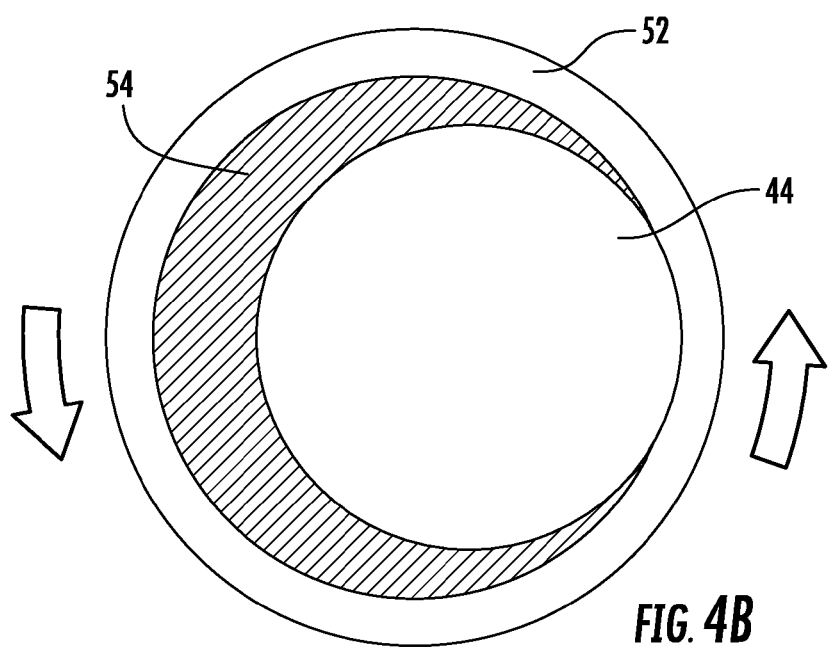
FIG. 4B of the drawings is an enlarged view during operation of the drive shaft in the bearing structure of an embodiment of the drive shaft bearing structure according to FIGS. 3A-3C.

As illustrated in FIGS. 4A and 4B, drive shafts 44A and 44B do not need to be centered in bearing structure 52 and can be in contact with one or more bearing surfaces 54 or internal portions of bearing structure 52. For example, in FIG. 4A drive shaft 44 is illustrated at rest and in contact with an internal portion of bearing structure 52. Similarly, FIG. 4B illustrates drive shaft 44 during operation and in contact with a different internal portion of bearing structure 52. As drive shaft 44 eccentrically rotates about its longitudinal axis in a counter-clockwise direction within bearing structure 52, drive shaft 44 contacts or bears against bearing surface 54 at continuously varying points. Conversely, drive shaft 44 can eccentrically rotate about its longitudinal axis in a clockwise direction within bearing structure 52. Bearing structure 52 can further comprise a quantity of lubricant (not shown), e.g. oil, to allow bearing structure 52 to support heavier loads and operate at higher rotational speeds.

Figure 5:
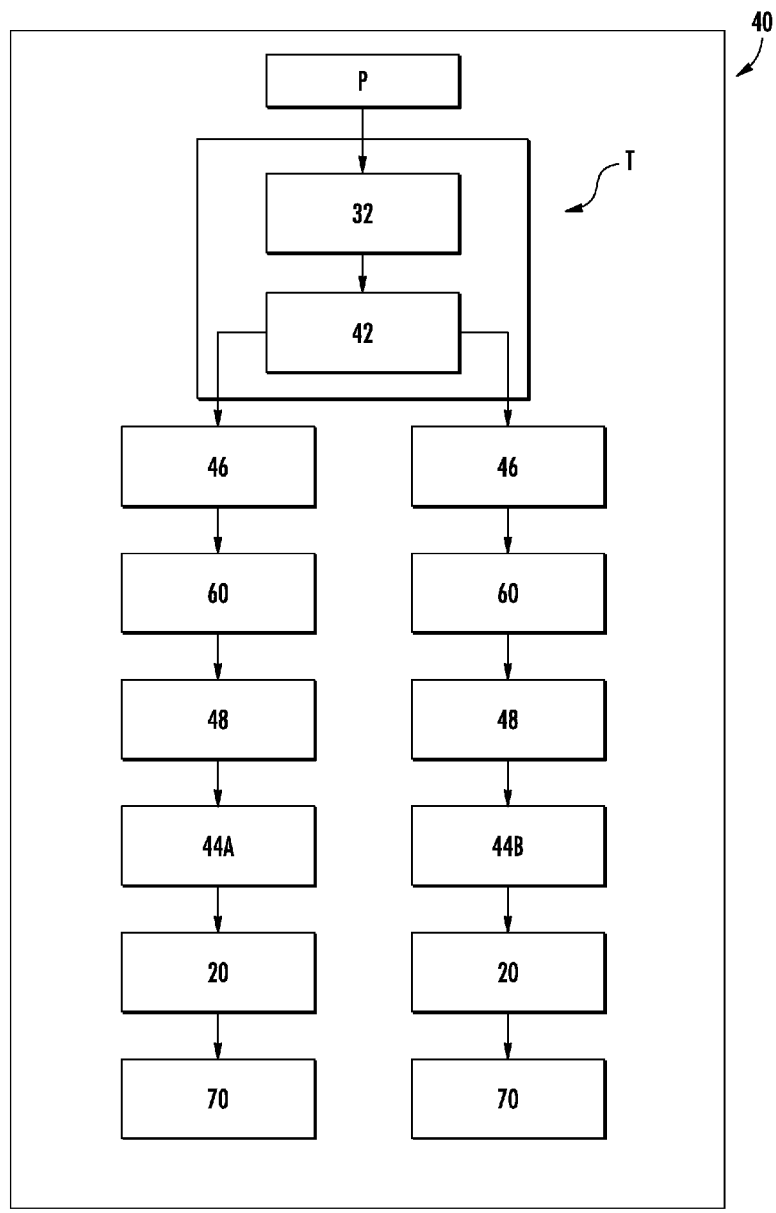
FIG. 5 of the drawings is a block diagram of an embodiment of the drive shaft bearing structure assembly according to FIG. 2.
Figure 6:
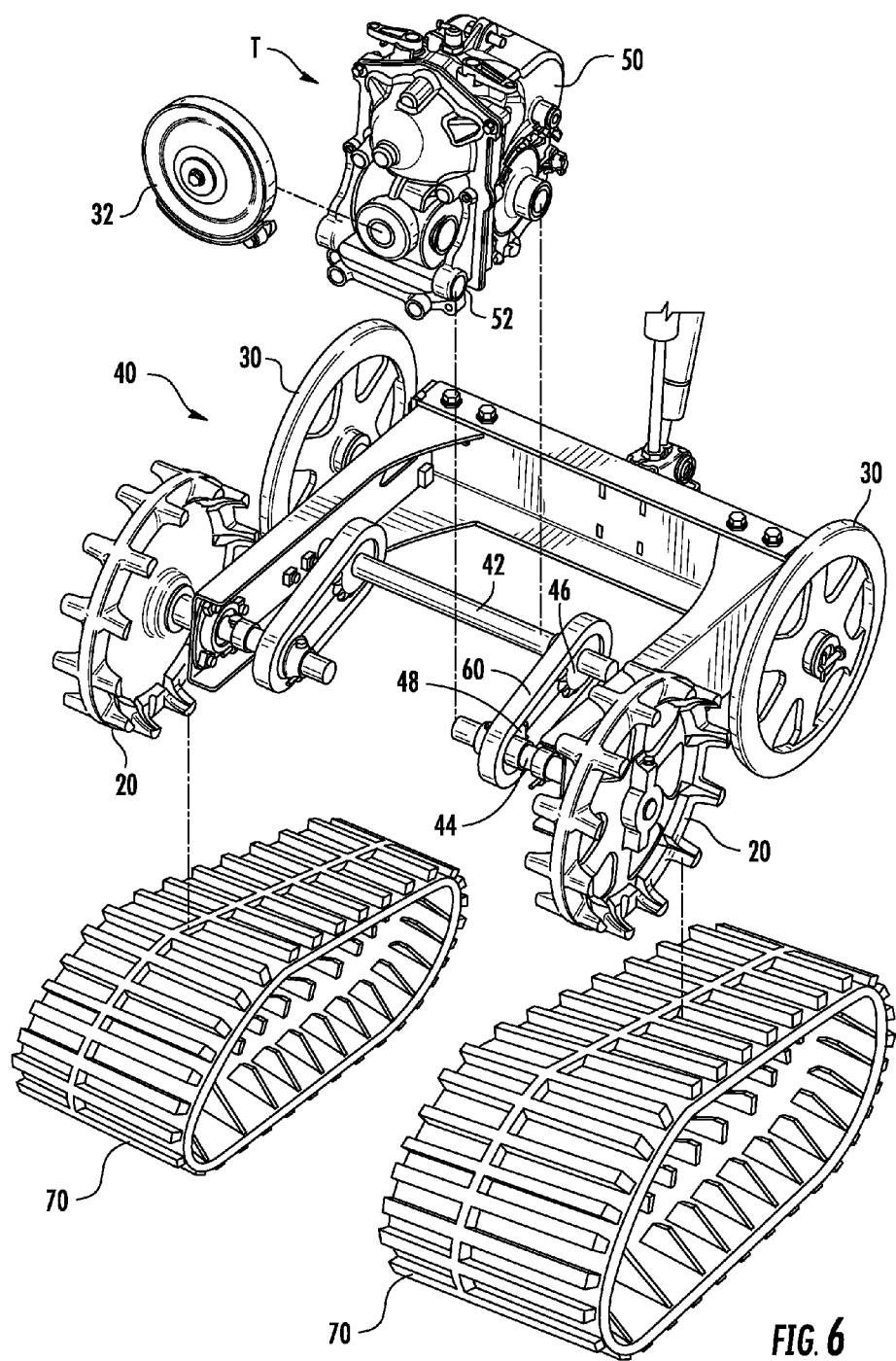
FIG. 6 of the drawings is an exploded view of an embodiment of the drive shaft bearing structure assembly according to the present subject matter.

FIG. 5 illustrates a schematic of one example of how drive shaft bearing structure assembly 40 can drive front track sprockets 20. An engine or motor P can power a transmission T, where transmission wheel 32 can be configured to increase and decrease the speed and reverse the direction at which a main output shaft 42 rotates. For example, transmission wheel 32 can be coupled to main output shaft 42 such that rotational movement of transmission wheel 32 translates to rotational movement of main output shaft 42. Main output shaft 42 can have an outer surface that can be cylindrical or at least mostly or substantially cylindrical in shape. Alternatively, main output shaft 42 can have a cross-sectional shape that can be rectangular, hexagonal, octagonal, or the like. Further, main output shaft 42 can have a non-symmetrical cross-section. In one aspect and as illustrated in FIGS. 5 and 6, main output shaft 42 can extend through a width of transmission casing 50 such that there can be approximately equal lengths of main output shaft 42 visible on either side of transmission casing 50. In another aspect (not shown), main output shaft 42 can be configured as two separate drive shafts of substantially equal lengths that can axially extend away from transmission casing 50. Furthermore, main output shaft 42 can be configured to drive front track sprockets 20. To do so, a rear chain sprocket 46 can be axially mounted to an outer surface of main output shaft 42 on either side of transmission casing 50. Rear chain sprockets 46 can have a centrally located aperture that is compatible with the cross-sectional shape of main output shaft 42. As main output shaft 42 rotates, rear chain sprockets 46 can similarly rotate.

Rotation of drive shaft 44 can be achieved through a transfer of rotation from each rear chain sprocket 46 to each front chain sprocket 48 using a drive chain 60 for each rear/front chain sprocket pair. (See, e.g. FIGS. 2 and 6). Drive chain 60 can be configured as a simple oval loop that can engage outer circumferences of each rear chain sprocket 46 and each front chain sprocket 48. As rear chain sprockets 46 rotate, drive chains 60 can transfer power to front chain sprockets 48, thereby causing front chain sprockets 48 to rotate. Rear chain sprockets 46 and front chain sprockets 48 can have a textured outer circumferential profile that engages with an inner circumference of drive chain 60. For example, as illustrated in FIG. 2, rear chain sprockets 46 and front chain sprockets 48 can be radially toothed on outer circumferences and can intermesh with a similar surface on the inner circumference of drive chain 60. Accordingly, drive chains 60 can transfer rotational power from each rear chain sprocket 46 to each front chain sprocket 48.

Front chain sprocket 48 can be axially mounted to an outer surface of a drive shaft 44. Front chain sprocket 48 can have a centrally located aperture that is compatible with the cross-sectional shape of drive shaft 44. In one aspect, snowblower 10 can be configured so that there are two separate drive shafts 44A and 44B. (See, e.g. FIGS. 2-5). Drive shafts 44A and 44B can have outer surfaces that can be cylindrical or at least mostly or substantially cylindrical in shape. Alternatively, drive shafts 44A and 44B can have a cross-sectional shape that can be rectangular, hexagonal, octagonal, or the like. Further, drive shafts 44A and 44B can have a non-symmetrical cross-section. In this configuration, a front chain sprocket 48 can be axially mounted on each drive shaft 44A and 44B and can each have a centrally located aperture that is compatible with the cross-sectional shape of drive shafts 44A and 44B.

Drive shafts 44A and 44B can drive their respective front track sprockets 20, which can be mounted at a distal, second portion of each of drive shafts 44A and 44B. The other, first portion of drive shafts 44A and 44B can be configured to be received by bearing structure 52 during axial rotation of drive shafts 44A and 44B. Bearing structure 52 can be part of transmission casing 50. In one aspect, bearing structure 52 can be bolted onto a front surface of transmission casing 50 as a journal bearing structure comprising two hollow, cylindrical protrusions or bushings each extending axially away from transmission casing 50 in opposing, opposite directions. (See, e.g. FIGS. 3A-3C). Thus, each bushing of bearing structure 52 can further be configured with a diameter that can be larger than a diameter of respective drive shafts 44A and 44B and can be configured with internal bearing surfaces 54 for each of respective drive shafts 44A and 44B to bear against during rotation. In such a configuration, as drive shafts 44A and 44B rotate, the first portion of each of drive shafts 44A and 44B can be received by bearing structure 52 and drive shafts 44A and 44B can bear against internal bearing surfaces 54 present in each bushing during axial rotation of drive shafts 44A and 44B. Subsequently, rotation of drive shafts 44A and 44B can drive rotation of respective front track sprockets 20.

Front track sprockets 20 can each be mounted at the distal, second portion of drive shafts 44A and 44B. Front track sprockets 20 can have an outer circumferential profile with teeth, cogs and/or sprockets. Front track sprockets 20 can be configured to engage with a looped oval tread 70 (see, e.g. FIGS. 1 and 6). A pair of rollers 30 can be coupled to each of front track sprockets 20 and can be mounted onto axles disposed on a chassis of the snowblower 10.

Figure 7:
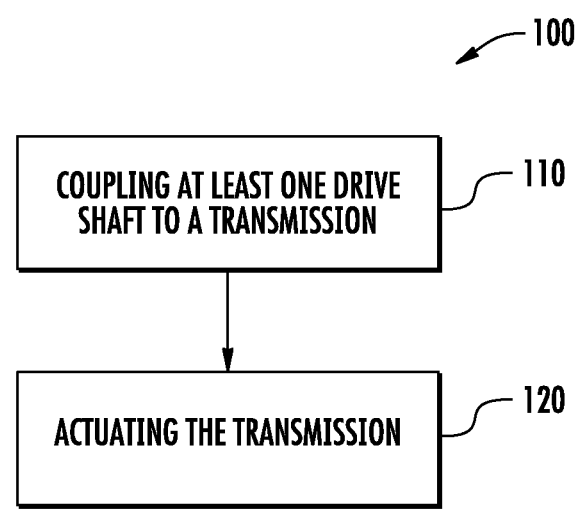
FIG. 7 of the drawings is a flow chart of an embodiment of a method of driving a track-type snowblower according to the present subject matter.

FIG. 7 is a flow chart illustrating an exemplary method, generally designated 100, for driving a track-type drive mechanism of a snowblower 10 via the systems and assemblies described hereinabove. In some aspects, the method 100 can consist of or include coupling step 110. For example, coupling step 110 can comprise coupling at least one drive shaft 44 to a transmission T contained in a transmission casing 50. Transmission casing 50 can comprise at least one bearing structure 52 as part of transmission casing 50. In further aspects, method 100 can comprise an actuating step 120. For example, actuating step 120 can comprise actuating transmission T to rotate drive shaft 44. During axial rotation of drive shaft 44, bearing structure 52 can be configured to receive a portion of drive shaft 44.

While the present subject matter has been has been described herein in reference to specific aspects, features, and illustrative embodiments, it will be appreciated that the utility of the invention is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, aspects, modifications and alternative embodiments, within its scope and including equivalents of the claims.

What is claimed is:

1. A drive shaft bearing structure assembly for a track-type snowblower, the assembly comprising:
    at least one drive shaft;
    at least one bearing structure disposed on a transmission casing and configured as at least one bushing comprising a bearing surface;
    a main output shaft with a first end and a second end, the first end being separated from the second end by a middle portion, wherein both the first end and the second end are external from, and on opposite sides of the transmission casing, wherein the main output shaft is coupled to both a transmission contained in the transmission casing and the at least one drive shaft and wherein the main output shaft is configured to receive torque from the transmission and transmit rotational energy to the at least one drive shaft; and
    at least one rear chain sprocket mounted to the main output shaft and at least one front chain sprocket mounted to the at least one drive shaft, wherein at least one drive chain connects the at least one rear chain sprocket to the at least one front chain sprocket;
    wherein the at least one drive shaft is configured to bear against the bearing surface of the at least one bushing during axial rotation of the at least one drive shaft.

2. The drive shaft bearing structure assembly of claim 1, wherein the at least one drive shaft comprises two drive shafts, wherein the at least one bearing structure is configured to receive a first portion of each of the two drive shafts during axial rotation of the two drive shafts.

3. The drive shaft bearing structure assembly of claim 2, further comprising a pair of front track sprockets, each front track sprocket being positioned at a second portion of each of the two drive shafts.

4. The drive shaft bearing structure assembly of claim 3, further comprising a pair of rollers coupled to the front track sprockets, wherein the assembly drives the front track sprockets.

5. The drive shaft bearing structure assembly of claim 2, wherein the at least one bearing structure is configured as two bushings, the two bushings each comprising a bearing surface, and wherein the first drive shaft is configured to bear against the first bearing surface and the second drive shaft is configured to bear against the second bearing surface during axial rotation of the two drive shafts.

6. The drive shaft bearing structure assembly of claim 5, wherein the two bushings of the at least one bearing structure are configured such that the two bearing surfaces are disposed on opposing, opposite sides of the transmission casing, and a center of each bearing surface is co-axially aligned with a center of the other bearing surface.

7. The drive shaft bearing structure assembly of claim 1, wherein the at least one bearing structure is bolted onto an exterior of the transmission casing as a journal bearing.

8. A track-type snowblower comprising:
    a transmission;
    at least one drive shaft coupled to the transmission;

a transmission casing containing the transmission;

at least one bearing structure disposed on the transmission casing and configured as at least one bushing comprising a bearing surface;

a main output shaft with a first end and a second end, the first end being separated from the second end by a middle portion, wherein both the first end and the second end are external from, and on opposite sides of the transmission casing, wherein the main output shaft is coupled to both a transmission contained in the transmission casing and the at least one drive shaft and wherein the main output shaft is configured to receive torque from the transmission and transmit rotational energy to the at least one drive shaft; and at least one rear chain sprocket mounted to the main output shaft and at least one front chain sprocket mounted to the at least one drive shaft, wherein at least one drive chain connects the at least one rear chain sprocket to the at least one front chain sprocket;

wherein the at least one drive shaft is configured to bear against the bearing surface of the at least one bushing during axial rotation of the at least one drive shaft.

9. The track-type snowblower of claim 8, wherein the at least one drive shaft comprises two drive shafts, wherein the at least one bearing structure is configured to receive a first portion of each of the two drive shafts during axial rotation of the two drive shafts.

10. The track-type snowblower of claim 9, further comprising a pair of front track sprockets, each front track sprocket being positioned at a second portion of each of the two drive shafts.

11. The track-type snowblower of claim 10, further comprising a pair of rollers coupled to the front track sprockets, wherein the transmission drives the front track sprockets.

12. The track-type snowblower of claim 9, wherein the at least one bearing structure is configured as two bushings, the two bushings each comprising a bearing surface, and wherein the first drive shaft is configured to bear against the first bearing surface and the second drive shaft is configured to bear against the second bearing surface during axial rotation of the two drive shafts.

13. The track-type snowblower of claim 12, wherein the two bushings of the at least one bearing structure are configured such that the two bearing surfaces are disposed on opposing, opposite sides of the transmission casing, and a center of each bearing surface is co-axially aligned with a center of the other bearing surface.

14. The track-type snowblower of claim 8, wherein the at least one bearing structure is bolted onto an exterior of the transmission casing as a journal bearing.

15. A method of driving a track-type snowblower, the method comprising:

coupling at least one main output shaft to a transmission, which is contained in a transmission casing, and to at least one drive shaft, wherein the transmission casing comprises at least one bearing structure disposed on the transmission casing, the at least one bearing structure being configured as at least one bushing comprising a bearing surface;

mounting at least one rear chain sprocket to the main output shaft;

mounting at least one front chain sprocket to a first portion of the at least one drive shaft;

connecting, using at least one drive chain, the at least one rear chain sprocket to the at least one front chain sprocket;

actuating the transmission to rotate the at least one main output shaft;

bearing, by the at least one drive shaft, against the bearing surface of the at least one bushing during axial rotation of the at least one drive shaft; and transmitting torque received from the transmission to the at least one drive shaft through the main output shaft and the at least one chain, wherein at least a first end and a second end of the main output shaft are external from, and on opposite sides of, the transmission casing.

16. The method of claim 15, comprising bolting the at least one bearing structure onto an exterior of the transmission casing as a journal bearing.

17. The method of claim 15, wherein the at least one drive shaft comprises two drive shafts, the method comprising mounting a pair of front track sprockets to a second portion of each of the two drive shafts.

18. The method of claim 15, comprising coupling the pair of front track sprockets to a pair of rollers.

19. The method of claim 15, wherein the at least one bearing structure is configured as two bushings, the two bushings each comprising a bearing surface, and wherein the first drive shaft is configured to bear against the first bearing surface and the second drive shaft is configured to bear against the second bearing surface during axial rotation of the two drive shafts.

20. The method of claim 19, wherein the two bushings of the at least one bearing structure are configured such that the two bearing surfaces are disposed on opposing, opposite sides of the transmission casing, and a center of each bearing surface is co-axially aligned with a center of the other bearing surface.

* * * * *